United States Patent [19]

Graybill

[11] 4,159,191

[45] Jun. 26, 1979

[54] FLUID ROTOR

[76] Inventor: Clinton L. Graybill, P.O. Box 396, Superior, Mont. 59872

[21] Appl. No.: 820,563

[22] Filed: Aug. 1, 1977

[51] Int. Cl.² ............................. F03D 1/06; F03D 7/04
[52] U.S. Cl. ........................................ 416/11; 416/189; 416/238; 416/41; 416/187
[58] Field of Search ................. 416/11, 178, 187, 211, 416/189 A, 238, 41

[56] References Cited

U.S. PATENT DOCUMENTS

| 137,565 | 4/1873 | Park | 416/189 A X |
|---|---|---|---|
| 589,946 | 9/1897 | Grunow | 416/187 |
| 756,372 | 4/1904 | Johnson | 415/2 |
| 774,168 | 11/1904 | Fornander | 416/126 |
| 1,002,833 | 9/1911 | Giddings | 415/2 |
| 1,361,696 | 12/1920 | Domenico | 415/3 |
| 1,502,433 | 7/1924 | Johanson | 416/41 X |
| 1,707,235 | 4/1929 | Sargent | 416/11 |

FOREIGN PATENT DOCUMENTS

| 909378 | 5/1946 | France | 416/11 |
|---|---|---|---|
| 1038090 | 9/1953 | France | 416/11 |
| 57732 | 10/1918 | Sweden | 416/187 |

Primary Examiner—Everette A. Powell, Jr.
Attorney, Agent, or Firm—Wells, St. John & Roberts

[57] ABSTRACT

A conical shaped rotor is described for rotation about a horizontal shaft axis for responding to or creating a moving airstream. The rotor is elongated and conical shaped along the rotor axis with elongated blades extending longitudinally and radially inward from an enlarged end to a reduced end. The blades are angularly offset between 1° and 15° from the rotor axis to cause an inner side edge of each blade to be closer to the rotor axis than an outer side edge without the blades being twisted about their longitudinal axis. In one form an electrical generator is operatively attached to the rotor shaft for generating electrical energy in response to the rotation of the rotor by wind passing therethrough. In a second form the rotor is driven by a motor to create an air flow therethrough to serve as a fan.

8 Claims, 12 Drawing Figures

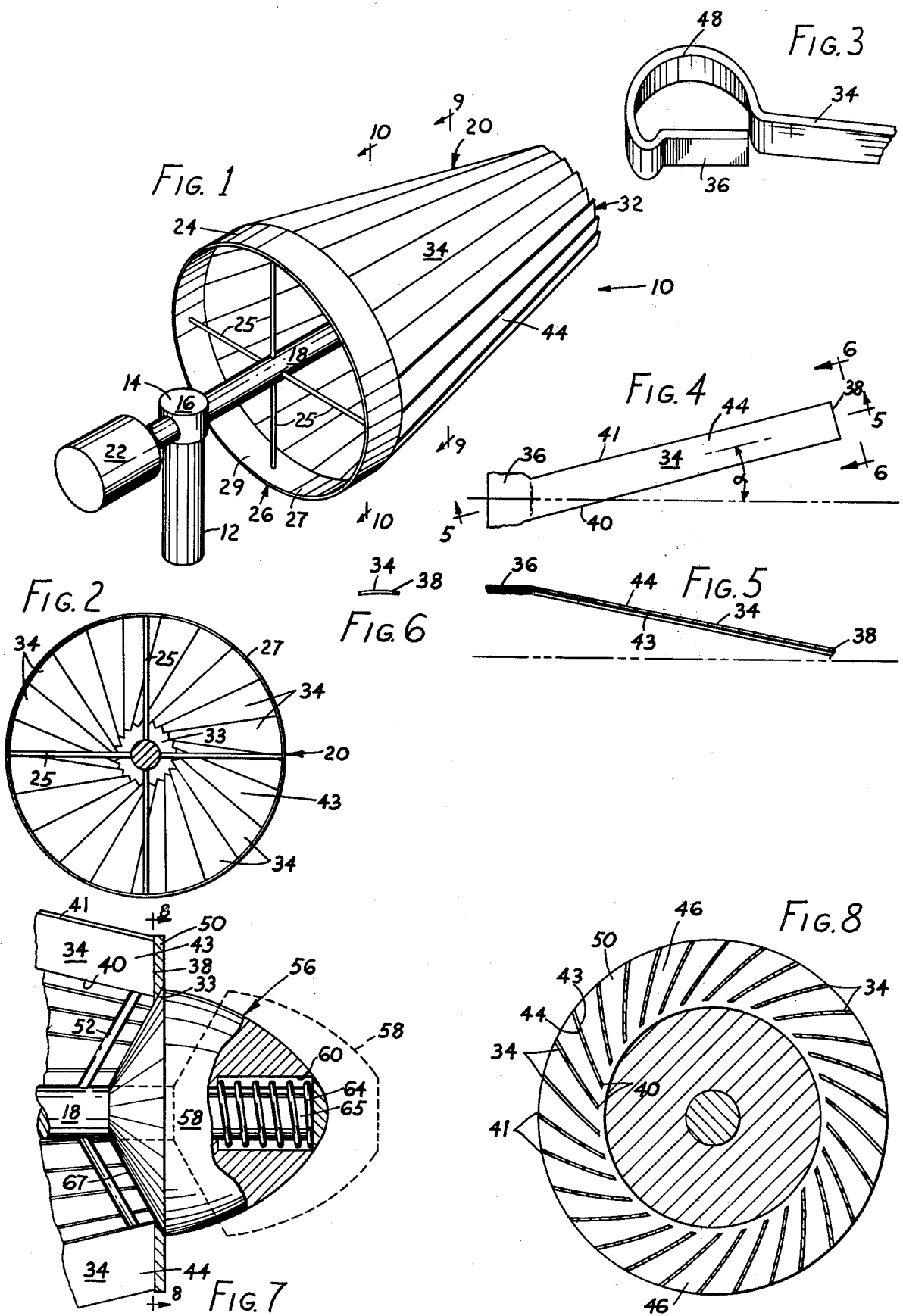

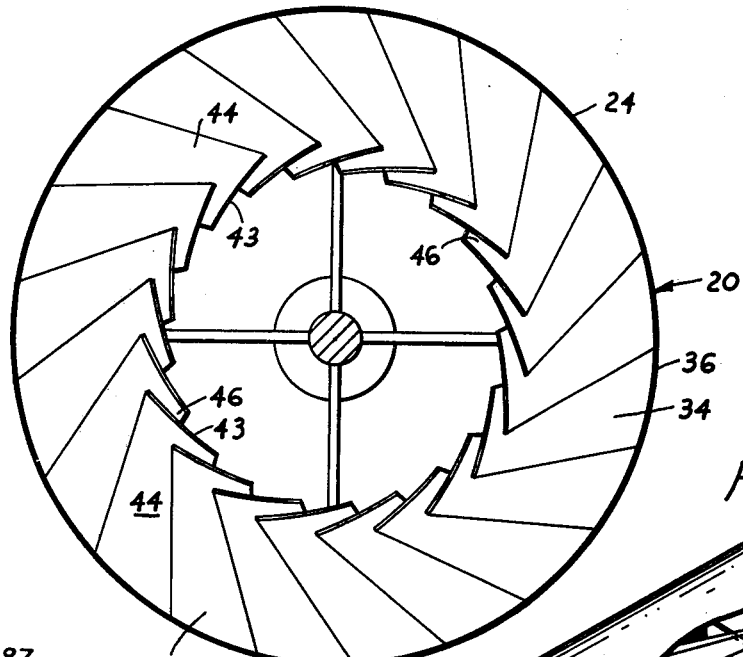
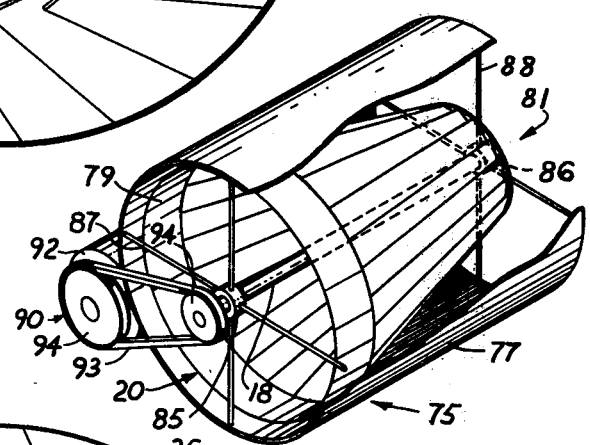
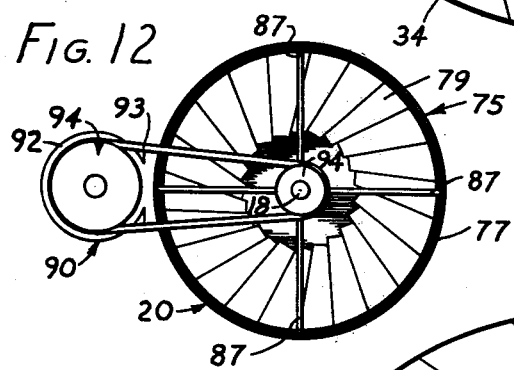
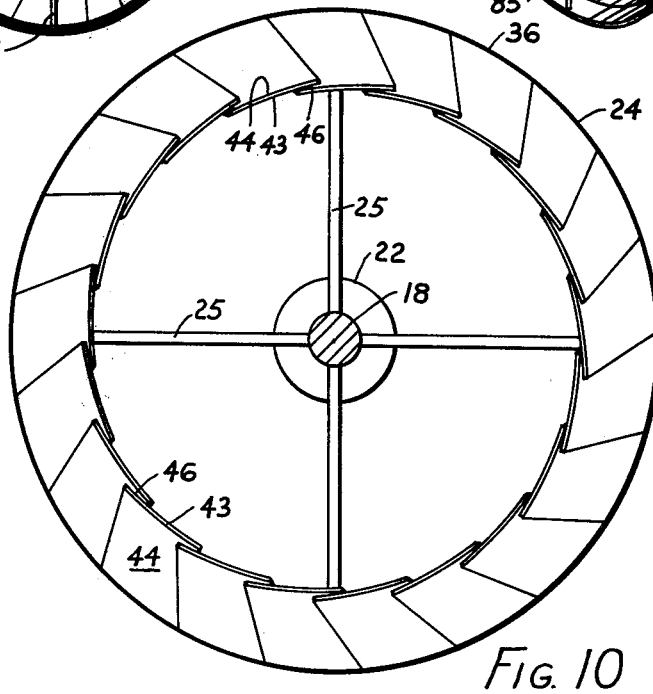

FLUID ROTOR

BACKGROUND OF THE INVENTION

The present invention generally relates to rotors for handling compressible fluids such as air and more particularly to rotors that are conical shaped and mounted for rotation about a horizontal axis.

One of the principal objects of this invention is to provide a very simple rotor that is relatively inexpensive to construct and easy to maintain and efficient in operation.

Other objects and advantages of this invention will become apparent upon reading the following detailed description of preferred and alternate embodiments.

BRIEF DESCRIPTION OF THE DRAWINGS

A preferred and several alternate embodiments are illustrated in the accompanying drawings, in which:

FIG. 1 is an isometric view of a wind-powered device having a rotor that includes the principles of this invention;

FIG. 2 is a front view of the rotor illustrating rotor blades that extend rearward and radially inward toward the axis of the rotor;

FIG. 3 is a fragmentary isometric view of an alternate embodiment of the rotor blades;

FIG. 4 is an isolated plan view of a single rotor blade illustrating an angular offset of the blade with respect to the axis of the rotor;

FIG. 5 is a cross-sectional view taken along line 5—5 in FIG. 4 illustrating the inward radial direction of the rotor blade;

FIG. 6 is an end view of the turbine blade taken along line 6—6 in FIG. 4;

FIG. 7 is an axial cross-sectional view taken along the axis of the rotor illustrating an alternate embodiment of the rotor;

FIG. 8 is a cross-sectional view taken along line 8—8 in FIG. 7;

FIG. 9 is a cross-sectional view taken along line 9—9 in FIG. 1;

FIG. 10 is a cross-sectional view taken along line 10—10 in FIG. 1;

FIG. 11 is an isometric view of a fan device having the rotor for creating a moving airstream in a conduit; and FIG. 12 is an end view of the fan device shown in FIG. 11.

DETAILED DESCRIPTION OF PREFERRED AND ALTERNATE EMBODIMENTS

Wind Powered Device

Referring now in detail to the drawings, there is illustrated in FIG. 1 a wind-powered device generally designated with the numeral 10 that includes an upright pedestal or support 12 for rotatably supporting a swivel 14 that is rotatable about a vertical axis. The swivel includes a housing 16 that rotatably supports a horizontal shaft 18 that is rotatable about a horizontal axis.

The device 10 includes as one of its principal components, an elongated conical shaped rotor 20 concentrically mounted on the shaft 18 and extending along the shaft axis for rotating about the shaft axis in response to the passage of wind axially through the rotor. The rotor 20 pivots about the vertical axis which is in front of the rotor to automatically track the direction of the wind. The wind-powered device 10 further includes an electrical generator 22 operably connected to the shaft 18 for generating electrical energy in response to the rotation of the shaft by the rotor 20. Electrical generator 22 in a preferred embodiment is diametrically opposite the rotor 20 with respect to the vertical axis of the swivel 18. Electrical generator 22 is operably connected to the housing 16 with the shaft 18 extending from the rotor through the housing 16 to the electrical generator 22 for operating the generator. The wind forces against the rotor cause the rotor to be self-centering with respect to the wind direction to eliminate the need for directional vanes, etc.

The rotor 20 includes a concentric elongated housing 24 that is supported on the shaft 18 by struts or braces 25 that extend radially outward from the shaft 18 to a front ring 27. Front ring 27 defines the front or enlarged end 26 of the rotor with a front circular entrance or enlarged intake 29 formed thereby to enable wind to enter the rotor through the entrance or enlarged intake 29. The rotor extends rearwardly along the shaft axis to a rear or smaller end 32 that has a rear or reduced exit opening 33 (FIG. 2).

The rotor 20 includes a plurality of longitudinally extending, elongated blades 34 that have lengths greater than the radius of the opening 29 that extend rearward from the front end 26 to the rear end 32. Each of the blades 34 extend from the front end 26 longitudinally rearward and radially inward with respect to the shaft axis towards the rear end 32 of the rotor with the blades progressively overlapping each other as the blades proceed rearward from the front end to the rear end. The rotor 20 in side view appears conical-shaped or frustoconical shaped.

Of considerable import, is the feature that the blades 34 extend rearward at an offset angle $\alpha$ with respect to the shaft axis (FIG. 4). It is preferable that the angle of offset $\alpha$ be between 1° and 15° with respect to the shaft axis.

Each of the blades 34 includes a base 36 which is affixed to the front ring 27. The base 36 of each blade may be formed integrally with the bases of the other blades or they may be separate and physically attached or otherwise secured to the front ring 27. Each blade 34 extends from the base 36 to a longitudinally spaced tip 38 adjacent the rear end 32. Each blade has an inner side edge 40 and an outer side edge 41. Each blade includes an inside concave surface 43 and an outside convex surface 44 (FIG. 5) that extends between the base and the tip 38. It should be noted that with the angular offset, the inner side edge 40 is progressively closer to the shaft axis than the outer side edge 41 as the blade proceeds rearward from the base 36 to the tip 38.

Additionally, the offset angle $\alpha$ of the blades provides for rotor side openings 46 extending substantially the length of the blades and between adjacent blades for enabling the wind to pass radially outward therethrough. Each rotor side opening 46 is preferably tapered having a progressively increased thickness between the blades as the blades proceed rearward from the base 36 to the tips 38. It can be seen in FIGS. 9 and 10 that the opening 46 between the blades preferably increases with the distance from the base 36. In FIG. 9 the opening 46 between the blades 34 is wider than illustrated in FIG. 10.

Additionally, as illustrated in more detail in FIG. 8, the side openings 46 expand radially outward from the inner side edges 40 to the outer side edges 41. More specifically the distance between adjacent inner side edges 40 is less than the distance between adjacent outer side edges 41 to provide an expanding throat between the blades.

In the preferred embodiment illustrated in FIGS. 1-6 each of the blades 34 is somewhat flexible and extends rearward from the base 36 unsupported to the free end or tip 38. The tips 38 define the rear exit opening 33 which may be dilated by radial outward movement of the ends 38 of the blades 34. Such a feature provides for automatic dampening or governing of the speed of the rotor with increasing wind speeds and rotor rotational speeds. Each of the blades 34 is directed radially inward to assume an initial position in which the rear exit opening 33 is rather small as illustrated in FIG. 2. As the speed of the rotor 20 rotating about the axis increases, the centrifugal force on the blades 34 will cause the blades to move radially outward at the free ends 38. Additionally as the wind increases and the force against the blades increases the blades 34 will automatically expand causing the rear exit opening 33 to dilate enabling more of the wind to pass through the rotor without passing over the blades. The spring bias on the blades provides for an automatic dampening or governing effect so as not to provide undue stresses on the rotor 20 or the blades 34. If the wind speed becomes excessive then the blades will spring outward to a neutral radial position with very little torque being applied to the shaft.

As the wind passes through the rotor, it normally passes axially and radially outward between the blades through the side openings 46 providing a lifting action on each of the blades creating a force component in the angular direction of rotation. Such force is translated into a moment in the blade that is transmitted through the rotor housing and struts 25 to the shaft 18.

In an alternate embodiment as illustrated in FIG. 3 each of the blades 34 may have a spring base 48 that biases the blades inward with considerable spring tension. The degree of spring bias on the blades may be varied as desired utilizing a variety of various techniques. FIG. 3 illustrates one of the many ways of increasing spring bias on the blades to bias the blades radially inward towards the axis of the shaft while enabling the blades during high wind conditions to be biased radially outward against the spring action to "feather" the blades and to provide a governing or dampening action on the turbine.

In an alternate embodiment illustrated in FIGS. 7 and 8 the blades 34 extend rearward and radially inward with the tips 38 rigidly affixed to a rear ring 50. Ring 50 has a diameter less than the diameter of the front ring 27 to provide a frustro-conically shaped rotor. The rear ring 50 is concentrically supported about the shaft through rear struts 52. In this embodiment the blades do not have a free end 38 that is spring-biased. However the rotor shown in the embodiment in FIGS. 7 and 8, has an enclosing means 56 that is responsive to the wind speed for progressively opening the rear exit opening 33 in response to increasing wind speeds.

Enclosing means 56 preferably includes an axially movable plug 58 having a bore 60 therein for mounting about the shaft end 65. A spring 64 is provided in the bore for biasing the movable plug 58 forward with a conical face surface 67 engaging the inner diameter of the ring 50 to enclose the rear exit opening 33. When the wind speeds exceed a certain value, the spring 64 will be deflected enabling the plug 58 to move rearward providing limited opening of the exit 33. The enclosing means 56 provides for a dampening or governing effect should the wind velocity increase above a desired value. However, during normal operation the wind is deflected radially outward through the tapered side openings 46 in the rotor over the blade surfaces 43 and 44 to generate a moment on the shaft 18.

Because of the symmetrical nature and conical shape of the rotor, the device automatically pivots about the vertical axis of the swivel 14 to align the axis of the shaft 18 with the direction of wind travel. If the wind direction changes, the device 10 automatically tracks such change. Consequently the device 10 does not need a direction vane to face the rotor 20 into the wind. The device 10 is capable of generating electrical energy at wind speeds less than ten miles per hour, yet is capable of withstanding hurricane winds without being damaged.

Fan Device

An alternate form of the present invention is illustrated in FIGS. 11 and 12 and includes a fan device 75 incorporating the rotor 20. In this form, the rotor 20 is driven about the shaft axis to generate a pressurized airstream in a cylindrical conduit or fan housing 77.

The rotor 20 is mounted coaxially within the cylindrical housing 77 intermediate an entrance or inlet 79 and an exit or outlet 81. The shaft 18 is supported coaxially within the conduit 77 by bearings 85 and 86. Bearings 86 are supported by struts or frame elements 87 and 88 respectively.

The shaft 18 is driven by a drive means 90 which includes an electrical motor 92, a belt 93 and pulleys 94. In response to the rotation of shaft 18, the rotor 20 draws air in through the inlet 79, increasing the velocity of the air over the blade surfaces 43 and 44, and discharges the air at an increased velocity or pressure through the outlet 81.

The above described embodiments are merely illustrative of the principles of this invention and numerous other embodiments may be readily devised without deviating therefrom. Therefore only the following claims are intended to define this invention.

What is claimed is:

1. A fluid rotor assembly comprising:

a support;

a shaft rotatably mounted on the support for rotation about a shaft axis;

an elongated rotor concentrically mounted to the shaft and extending along the shaft axis for concurrent rotation with the shaft;

said rotor having a concentric circular entrance at a front end thereof with a selected radius about the shaft axis;

said rotor having a plurality of longitudinally extending, elongated blades that have lengths greater than the radius of the opening;

each of said blades extending from the front end longitudinally rearward and radially inward with respect to the shaft axis toward a rear end of the rotor with the blades progressively overlapping each other as the blades proceed rearward; and each of said blades extending rearward at an offset angle with respect to the shaft axis with one side edge of each blade being progressively closer to the shaft axis than a complementary opposite side edge as the blade proceeds rearward forming elongated rotor side openings between adjacent blades for fluid to pass therethrough, in which each side opening has a progressively increasing thickness between blades as the blades proceed rearward for enabling the fluid to pass transversely between the blades through the elongated rotor side openings.

2. The fluid rotor assembly as defined in claim 1 wherein the rotor is frustro-conical shaped.

3. The fluid rotor assembly as defined in claim 1 wherein the blades are flexible and are affixed at the front end and extend unsupported rearward and biased radially inward to free ends forming a rear opening adjacent the rear end of the rotor so that the free ends of the blade may progressively spring radially outward to dilate the rear opening in response to increasing speeds of the fluid through the rotor to dampen the resultant rotational speed of the rotor about the shaft axis.

4. The fluid rotor assembly as defined in claim 1 wherein the blades are offset at an angle between 1° and 15° with respect to the shaft axis.

5. The fluid rotor assembly as defined in claim 1 wherein each blade extends from a blade base adjacent the rotor front end to a blade tip adjacent the rotor rear end and wherein each blade has a curved transverse cross section in which a substantial portion thereof has a constant radius of curvature between the base and the tip.

6. The fluid rotor assembly as defined in claim 1 wherein each blade extends from a blade base adjacent the front end to a blade tip adjacent a rotor rear end and wherein each blade has a curved transverse cross section in which the centers of curvature of the blade between the base and the tip lie in a common plane.

7. The fluid rotor assembly as defined in claim 1 wherein the blades extend rearward and radially inward to the rear end in which the rear end includes a concentric exit opening and wherein the device includes a movable plug means mounted adjacent the exit opening for directing fluid radially outward through the rotor side openings and for progressively enlarging the exit opening in response to increasing fluid speeds to dampen the resultant rotational speed of the rotor about the shaft axis.

8. The fluid rotor assembly as defined in claim 1 in which the rotor includes governing means for automatically dampening the increased rotational speed of the rotor in response to increased fluid speeds.

* * * * *